United States Patent Office 3,537,884
Patented Nov. 3, 1970

3,537,884
REDUCTION OF STATIC ELECTRIFICATION
OF POLYVINYL CHLORIDE
Harry Distler and Alfred Hauss, Ludwigshafen (Rhine),
Heinz Pohlemann, Limburgerhof, Pfalz, and Bernd
Stanger, Ludwigshafen (Rhine), Germany, assignors to
Badische Anilin- & Soda-Fabrik Aktiengesellschaft,
Ludwigshafen (Rhine), Germany
No Drawing. Filed June 20, 1967, Ser. No. 647,305
Claims priority, application Germany, June 29, 1966,
1,669,653
Int. Cl. B32b 27/30
U.S. Cl. 117—100      6 Claims

ABSTRACT OF THE DISCLOSURE

A process for reducing static electrification of polyvinyl chloride by treating polyvinyl chloride with alkylsulfonium salts in which two alkyl groups bear hydroxyl groups as substituents.

---

The invention relates to a process for reducing static electrification of polyvinyl chloride in which polyvinyl chloride is coated with an alkylsulfonium salt in which two alkyl groups bear hydroxyl groups as substituents.

Polyvinyl chloride, particularly polyvinyl chloride which has been prepared in aqueous suspension, has a tendency to accumulate electric charges when rubbed owing to its dielectric properties. The electric charges result in an intensified tendency of vinyl chloride polymers to become dirty. Static build-up can also cause disturbances in processing for example powdered vinyl chloride polymers, for instance in filling and emptying sacks or in supplying polyvinyl chloride powder to processing machines.

To avoid this disadvantage, the surface of vinyl chloride polymers has been treated with antistatic substances, for example by dipping moldings of polyvinyl chloride into solutions of antistatics. Organic onium compounds, such as ammonium compounds, sulfonium compounds and phosphonium compounds, are used as antistatics in the process for reducing static electrification of high polymers according to U.S. patent specification No. 2,912,352. Organic ammonium compounds, such as trimethyloctyl ammonium chloride, dimethyldioctadecyl ammonium chloride and dodecylpyridinium chloride are particularly suitable for the said prior art method. The resistivity and the thermal stability of polyvinyl chloride are however very greatly decreased by treating the surface of polyvinyl chloride moldings and particularly suspension polyvinyl chloride powder with organic ammonium salts or phosphonium salts.

We have now found that the reduction of static electrification of polyvinyl chloride by treating the polyvinyl chloride with organic onium salts can be advantageously carried out by using as the onium salt an alkyl sulfonium salt which bear hydroxyl groups as substituents.

These sulfonium salts may be prepared by conventional methods. It is not necessary in the new process to use individual sulfonium salts on their own. Rather, mixtures of alkylsulfonium salts, such as are obtained by adding on hydroxyalkylmercaptans to mixtures of α-olefins, particularly of monoolefins having six to twenty-two carbon atoms, are also suitable.

The sulfonium salts have the following general formula:

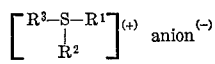

Suitable alkylsulfonium salts have two alkyl groups $R^1$ and $R^2$ which have one to eight carbon atoms and which bear hydroxyl groups as substituents. $R^1$ and $R^2$ are preferably hydroxyethyl groups. $R^3$ denotes an alkyl group which may be linear, cyclic or branched and contains six to twenty-two, preferably eight to fifteen, carbon atoms.

The anions belonging to the sulfonium salts are in general of minor importance, but sulfonium salts having polyvalent anions are particularly suitable. Examples of suitable anions are: halogen ions, for example chlorine ions; the divalent radical of sulfuric acid; the trivalent radical of phosphoric acid; acetate ions; tosylate (p-toluenesulfonate) ions; and the anion of methylsulfuric acid.

Examples of alkylsulfonium salts which are very well suited to the purposes of this invention are:

cyclooctene-4-yl-dihydroxyethylsulfonium sulfate,
cyclooctene-4-yl-dihydroxyethylsulfonium acetate,
cyclooctene-4-yl-dihydroxyethylsulfonium tosylate,
n-nonanyldihydroxyethylsulfonium sulfate,
n-undecanyldihydroxyethylsulfonium sulfate,
n-undecanyldihydroxyethylsulfonium tosylate,
n-nonanyldihydroxyethylsulfonium methylate,
n-nonanyldihydroxyethylsulfonium nonanyl sulfonate,
n-pentadecanyldihydroxyethylsulfonium sulfate,
and mixtures of sulfonium salts of this type.

The vinyl chloride polymers may be coated with the alkylsulfonium salts by conventional methods. For example the vinyl chloride polymer moldings may be dipped into solutions of the alkylsulfonium salts or sprayed with such solutions. When the vinyl chloride polymer is in powder form, it may be suspended in a solution of the alkylsulfonium salt and then separated therefrom. After the treatment of the polyvinyl chloride with solutions of the alkylsulfonium salts, the polymers may be dried by conventional methods, particularly at subatmospheric pressure and if desired at elevated temperatures. Water is particularly suitable as solvent for the alkylsulfonium salts. Examples of other suitable solvents are easily volatile alcohols, such as methanol and ethanol.

When the alkylsulfonium salts are used in the form of their solutions, their concentration in the solvent may vary within a wide range. Good results are obtained for example with 0.001 to 10% aqueous solutions but in special cases solutions containing more than 10% of the alkylsulfonium salt may be used. Solutions which contain 1 to 5% by weight of alkylsulfonium salt, with reference to the solution, have proved to be particularly suitable. In the case of powdered vinyl chloride polymers, for example having a particle size of up to 1 mm., particularly from 10 to 500 microns, particularly good results can be achieved when the powder contains 0.005 to 0.5%, particularly 0.01 to 0.1%, by weight of alkylsulfonium salt (with reference to the amount of vinyl chloride polymer treated) after treatment with a solution of the alkylsulfonium salt.

Polyvinyl chloride which has been treated in accordance with this invention has about the same strongly decreased tendency for static build-up as polyvinyl chloride which has been treated under comparable conditions with organic ammonium salts. Its resistivity is however much less reduced than that of polyvinyl chloride which has been treated with organic ammonium salts. Moreover polyvinyl chloride which has been treated in accordance with this invention exhibits a higher thermal stability than untreated polyvinyl chloride, for example during processing, while polyvinyl chloride which has been treated by a conventional method with organic ammonium salts or phosphonium salts has a lower thermal stability than untreated polyvinyl chloride. The effects of the said kind are particularly evident in the case of powdered vinyl chloride polymers which have been prepared by suspension polymerization.

The invention is further illustrated by the following examples in which parts and percentages are by weight.

EXAMPLE 1

Suspension polyvinyl chloride powder having a particle size distribution of from 40 to 150 microns with an addition of 0.05%, 0.02% and 0.005% by weight of n-nonanyl-di-(hydroxyethyl)-sulfonium sulfate is subjected to the following treatment: The mixture is treated in a porcelain ball mill at 45 r.p.m. first for one minute and then for ten minutes. The pourability of the powder is determined in a Ford beaker (6 mm. nozzle) prior to the treatment, after one minute and after ten minutes. The figures given in brackets in the following table denote the bulk densities (in g./100 ccm.) of the samples after the pouring test.

TABLE

| | Amount of additive, percent | | |
|---|---|---|---|
| | 0.05 | 0.02 | 0.005 |
| Pourability in grams per second | | | |
| Not treated in ball mill | 2.2 (49.3) | 2.1 (49.3) | 2.0 (49.3) |
| Treated in ball mill for one minute | 2.2 (49.3) | 2.0 (49.1) | 1.4 (48.6) |
| Treated in ball mill for 10 minutes | 2.2 (49.3) | 2.0 (49.1) | 1.4 (47.9) |

Without the addition of a sulfonium salt, the suspension polyvinyl chloride powder has a pourability of 1.5 g./sec. and after having been ground for one minute will no longer pour from the Ford beaker (bulk density 49.3 g./100 ccm.).

EXAMPLE 2

(a) Suspension polyvinyl chloride is mixed with 0.05% by weight of n-nonanyl-di-(hydroxyethyl)-sulfonium sulfate and a commercial lead stabilizer or barium/cadmium stabilizer and samples of the resulting molding material are tested for thermal stability in a heating cabinet at 170° C. The samples did not exhibit decomposition phenomena until after 120 minutes or 100 minutes.

(b) The same amount of n-lauroylamidopropyl trimethylammonium tosylate or methyltriphenylphosphonium tosylate is used (instead of the sulfonium salt) in addition to the commercial stabilizer. Under otherwise the same conditions, decomposition occurs after only 40 to 60 minutes. In the case of suspension polyvinyl chloride which contains only the commercial stabilizers but no onium compounds, decomposition occurs under the same conditions after 80 minutes.

(c) The suspension polyvinyl chloride described under (a) is additionally plasticized in a conventional manner. Its resistivity at 25° C. is $3.3 \times 10^{13} \tau$. The resistivity of suspension polyvinyl chloride containing the substances specified under (b) which has been plasticized by a conventional method is $2.7 \times 10^{11} \tau$ (ammonium compound) or $8.7 \times 10^{11} \tau$ (phosphonium compound).

EXAMPLE 3

Samples of finely powdered polyvinyl chloride which have been obtained by suspension polymerization and having a particle size distribution of 50 to 300 microns are each treated with 2% aqueous solutions. Such amounts are used that after evaporation of the water 0.05% by weight of sulfonium salt remains on the polyvinyl chloride samples.

The samples are treated in a ball mill as described in Example 1 for a period of ten minutes. The pourability of the powder is determined. The time within which a certain amount of powder runs out from a Ford beaker (6 mm. nozzle) is measured. The results are collected in Table 2, in which the second column gives the pourability in g./second after ten minutes.

Table 2

Sulfonium salt used (without addition): Cannot be poured
- Cyclooctene - 4 - yl - dihydroxyethylsulfonium sulfate _____ 2.2
- Cyclooctene - 4 - yl - dihydroxyethylsulfonium acetate _____ 2.1
- Cyclooctene - 4 - yl - dihydroxyethylsulfonium tosylate _____ 2.3
- n-Nonanyldihydroxyethylsulfonium sulfate ____ 2.5
- n-Undecanyldihydroxyethylsulfonium sulfate __ 1.8
- n-Undecanyldihydroxyethylsulfonium tosylate _ 2.0
- n-Nonanyldihydroxyethylsulfonium methylate _ 2.0
- n-Nonanyldihydroxyethylsulfoniumnonanyl sulfonate _____ 1.9
- n-Pentadecanyldihydroxyethylsulfonium sulfate _____ 2.0

The results show that uncoated samples cannot be poured.

We claim:

1. A process for reducing static electrification of polyvinyl chloride which comprises: treating polyvinyl chloride with an aqueous solution of an alkylsulfonium salt of the general formula

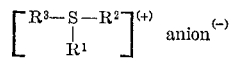

in which $R^3$ denotes an alkyl group containing six to twenty-two carbon atoms and $R^1$ and $R^2$ denote alkyl groups each containing one to eight carbon atoms, and bearing hydroxyl groups as substituents; the amount of said alkylsulfonium salt applied to said polyvinyl chloride being such that after the water has evaporated, 0.005 to 0.5% by weight of the alkylsulfonium salt remains on the polyvinyl chloride.

2. A process as claimed in claim 1 wherein finely powdered polyvinyl chloride having a particle size range of from 10 to 500 microns is treated.

3. A process as claimed in claim 1 wherein the alkylsulfonium salt used contains a sulfate anion.

4. A process as claimed in claim 1 wherein the alkylsulfonium salt used contains a p-toluenesulfonate anion.

5. A process as claimed in claim 2 wherein the alkylsulfonium salt used contains a sulfate anion.

6. A process as claimed in claim 2 wherein the alkylsulfonium salt used contains a p-toluenesulfonate anion.

References Cited

UNITED STATES PATENTS

| 2,836,517 | 5/1958 | Gruber et al. | 117—139.5 X |
| 2,897,170 | 7/1959 | Gruber | 117—138.8 X |
| 2,993,234 | 7/1961 | Miura et al. | 264—107 |
| 3,159,682 | 12/1964 | Baird et al. | 260—607 |

WILLIAM D. MARTIN, Primary Examiner

T. G. DAVIS, Assistant Examiner

U.S. Cl. X.R.

117—138.8